May 10, 1938.  E. A. LARSSON  2,117,028

TROLLEY DEVICE

Original Filed Aug. 17, 1935

Inventor
ERNST A. LARSSON
Attorney

Patented May 10, 1938

2,117,028

UNITED STATES PATENT OFFICE 2,117,028

TROLLEY DEVICE

Ernst A. Larsson, Mansfield, Ohio, assignor to The Ohio Brass Company, Mansfield, Ohio, a corporation of New Jersey Original application August 17, 1935, Serial No. 36,699. Divided and this application February 12, 1937, Serial No. 125,457

6 Claims. (Cl. 191—85)

My invention relates to a mechanism for controlling trolley poles used on vehicles deriving current from overhead conductors.

It has been the practice for many years to equip such vehicles with trolley tenders, that is, a device that will automatically maintain the rope leading to the trolley pole slightly taut or to lower the trolley pole should it accidently leave the trolley wire or both.

With the advent of the trolley bus the requirements expected of the device and the requirements on part of the trolley bus operator in resetting the device were greatly increased as the device was necessarily equipped with stronger retrieving springs making it much more difficult for the operator to reset the device and in addition the trolley buses are equipped with two poles and trolley tenders in place of one.

One of the objects of my invention is to provide an apparatus for automatically rendering inoperative the retrieving system whereby the vehicle operator effects the lowering of one or both of the trolley poles at will.

Another object of my invention is to automatically arrest the downward movement of the trolley pole when such movement has been effected by the operator, by rendering the lowering system inoperative.

Another object of my invention is to provide means to catch and hold the pole in the lowered position.

My invention resides in the new and novel construction, combination, and relation of the various parts herein described and shown in the accompanying drawing.

In the drawing:—

Figure 1:
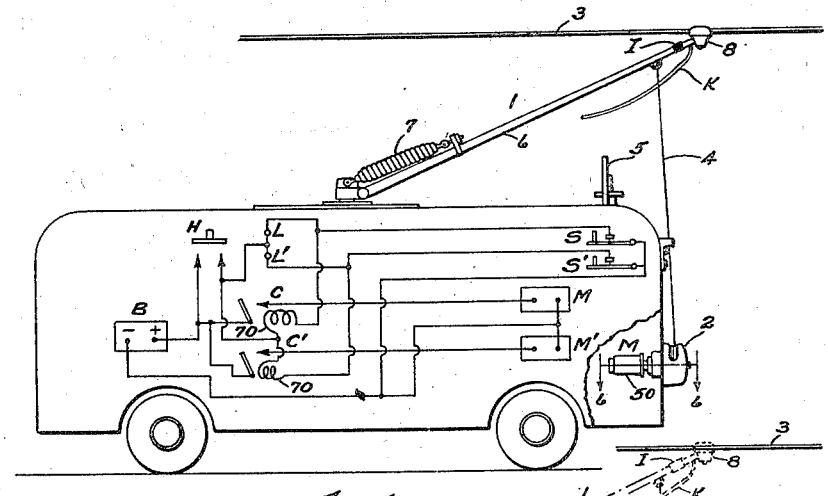
Fig. 1 is a schematic view showing the arrangement of my invention with respect to the vehicle, the trolley pole, and the system for lowering the trolley pole.

This application is a division of my co-pending application filed August 17, 1935, Serial Number 36,699.

My invention may be used with trolley buses usually equipped with two sets of current collecting devices 1 or with street cars equipped with a single current collecting device.

These vehicles are also provided with trolley tenders 2 also called trolley catchers or trolley retrievers and by means of which the collecting mechanism 1 may be automatically lowered should the collecting device accidentally leave the trolley wire 3. The device tends to keep the rope free of slack as the current collector rises and falls relative to the vehicle.

In connection with the vehicle, I provide a hold-down and circuit-controlling device 5, such that when the current collecting device has been moved to its lowered position it will be automatically caught and held in its lowered position and simultaneously a normally closed switch will be opened as later explained.

The trolley tender 2 is arranged to operate automatically to pull the current collecting device downwardly by means of a spring and is also arranged to be operated by means of an electric motor at will of the vehicle operator.

The current collecting device 1 may be of the usual type comprising a pole 6 biased to move upwardly by means of the spring 7 and hold the current collector shoe 8 in contact with the trolley wire 3.

The hold-down device 5 comprises a base 9 to which is secured spaced uprights 10 provided with a guideway 11 through which the pole 6 moves to its lowered position.

The uprights 10 are provided with extending and sloping arms 12 which may be of any length and degree of slope desired in order to guide and line the trolley pole with respect to the slot 11. The arms 12 may be equipped with rubber facings 13 which tend to silence the guiding of the trolley pole into the slot 11.

Figures 3, 4:
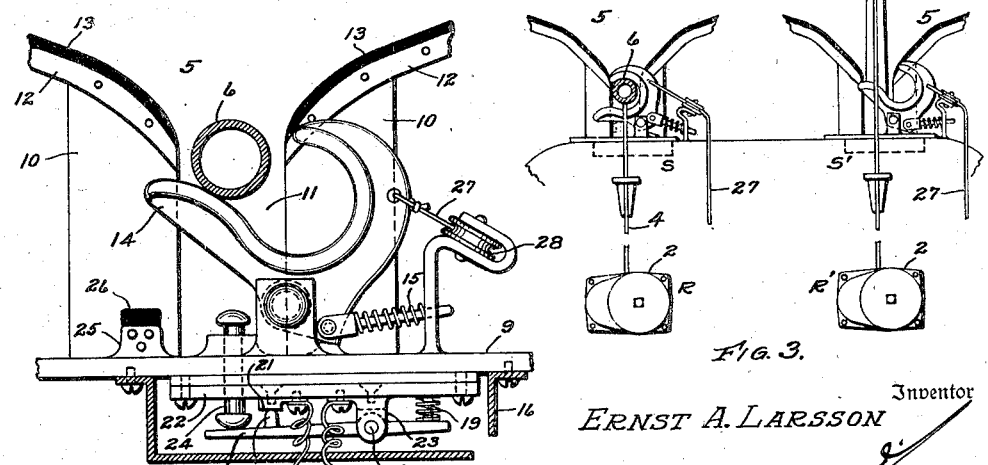
Fig. 3 shows a partial view of the rear end of a bus on which is mounted two of my inventions and showing one pole as being entirely lowered and automatically held down and the other pole still in its normal operating position in contact with the trolley wire.
Fig. 4 is an enlargement of one of the hold-down and cut-out devices shown in Fig. 3 and comprising my invention.

Pivotally mounted on the base 9 is a hook member 14 which is shown in its two positions in Fig. 3 and in its pole receiving position in Fig. 4. The member 14 is yieldingly held in its two positions by means of an over-center spring 15. As the pole 6 is lowered and engages with the hook 14, the hook will be moved to its holding position shown to the left in Fig. 3.

Also, mounted on the base 9 is a switch box 16 in which is mounted a circuit control switch which is normally closed, that is, when the trolley pole is in its raised position. The switch comprises a switch arm 17 pivoted at 18 and raised to its closed position by means of the spring 19. The switch arm 17 is provided with a contact 20 arranged to engage the contact 21 mounted on the insulating base 22 which is secured to the member 9.

The pivotal mounting 23 is also secured to the insulating base 22. The contact 21 and the pivotal mounting 23 are arranged to receive conductors forming part of the aforesaid control system. The switch is provided with an insulated operating plunger 24 which is mounted to reciprocate and to hold the switch arm 17 in its downward position when the hook 14 is in its full holding position shown at the left of Fig. 3, thus separating the contacts 20 and 21 and opening the switch and circuit controlled thereby. In Fig. 4 the switch is shown in its closed position.

As the trolley pole may be brought down with considerable force either through the operation of the motor or the spring 7, I provide a bumper 25 having a cushion 26 of resilient rubber to be engaged by the hook 14 when the pole is brought to its lowest position. This also eliminates the clash of metal when the hook 14 is brought into contact with its stop.

When desired, the hook 14 may be moved to its raised position by means of the rope 27 which passes around one or more sheaves 28 to bring it to a position where it is convenient for the operator.

Figure 2:
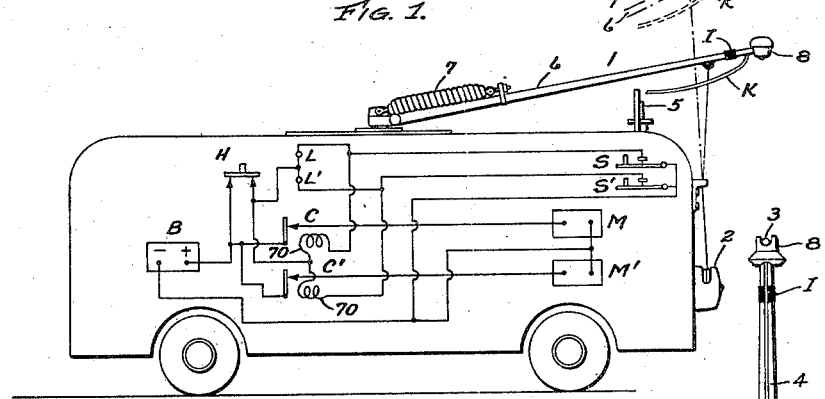
Fig. 2 is a schematic view similar to Fig. 1, showing the trolley pole as being lowered in the direction of the vehicle into operative relation with my invention after the operator has set the retrieving system in operation.

In order to set forth a better understanding of my invention and its purpose, I have shown in Figs. 1 and 2 the system of circuits, switches, retrievers, etc. which I use for lowering the trolley poles and which system is automatically rendered inoperative when the pole has been lowered to a predetermined position. Such inoperation is brought about by the switch operated by the lowered pole.

Referring to Figs. 1 and 2, S and S' represent the two switches controlled by the hold-down device, and M and M' represent the motors for operating the retrievers R and R' respectively. B represents a storage battery or other source of current supply. H represents a hand-operated push-button for the use of the operator, and C and C' represent magnetically closed switches for the motors M and M' respectively, and L and L' are signal lights for indicating when the switch H is closed, if the system is working, and also indicates whether the switches S and S' respectively are open or closed.

When the operator desires to lower the current collecting device, or devices, he closes the switches 8, thus energizing the coils 70 of the control switches C and C' thus closing the switches C and C' thereupon directly connecting the motors M and M' to the battery B. This energizes the motors and they are thrown into operative mesh or relation with the respective retrievers R and R' and the retrievers will be operated, winding in the rope 4 and drawing down the trolley pole or poles. Both poles in the arrangement shown will be drawn down simultaneously until each has reached its lowest predetermined position, and the hook 14 has been forced into its locking position, thus opening the switches S and S'. Upon the opening of the switches the coils 70 will be de-energized and the switches C and C' will open thus cutting off current to the motors M and M'.

If there is only one pole on the vehicle then only a part of the above equipment is required, as for instance, the switch C, hold-down device 5 therefor, switch S, retriever R, motor M, and the controlling circuits therefor. Insulation is interposed at I between the trolley pole and current collector, thus rendering the pole 6 unenergized and the current may be carried directly from the current collector to the car through the medium of an insulated conductor K, shown in Fig. 1.

Having described my invention, I claim:—

1. A trolley pole guide and hold-down device comprising a structure formed with a slot and inward and downward sloping edges to guide a trolley pole into said slot, resilient non-metallic means mounted on said sloping edges to be contacted by the trolley pole, hooked means pivotally mounted to move to two positions, one position to hold the trolley pole in its lowered position and the other to release the pole and spring means to hold the hook in either position, the hook movable to its holding position by pressure thereon of the trolley pole as moved to its lowered position, manually operated means to move the hook to its releasing position in which it is held until moved to its holding position by the pole.

2. A trolley pole guide and hold-down device comprising a structure formed with a slot and inward and downward sloping edges to guide a trolley pole into said slot, resilient non-metallic means mounted on said sloping edges to be contacted by the trolley pole, hooked means pivotally mounted to move to two positions, one position to hold the trolley pole in its lowered position and the other to release the pole and spring means to hold the hook in either position, the hook movable to its holding position by pressure of the trolley pole thereon as the pole moves to its lowered position, the hook remaining in its releasing position until moved to its holding position by said pole.

3. The combination of a trolley pole mounted on a vehicle and having a lowered and a raised position of a trolley pole hold-down device mounted on the vehicle and comprising a structure having a vertical slot and means to guide a trolley pole into said slot, a pivotally mounted hook having a pole holding position when the pole is in its lowered position and a pole releasing position when the pole is in its raised position, an over-center spring holding the hook in its holding position when the pole is in its lowered position and holding the hook in its releasing position while the pole is in its raised position, a switch to control a circuit, having an open position when the hook is in its holding position and having a closed position when the hook is in its releasing position, the hook arranged to be moved to its holding position by the lowering movement of the trolley pole and the hook to hold the switch to its open position when the pole is in its lowered position.

4. A trolley pole hold-down device comprising a pair of spaced upright arms forming a guiding channel therebetween to receive and guide a trolley pole when being lowered, a pivotally mounted hook having two positions namely a locking position to which it is movable by the pole to hold the pole in its lowered position and a releasing position in which the hook is held while the pole is in its raised position and an over-center spring to hold the hook in either its releasing or its locking positions.

5. The combination with a trolley pole of a pivotally mounted latch having holding and releasing positions, a spring operating to yieldingly hold the latch in its lowered position, means to guide the pole as it is lowered into operative relation to the latch, whereby the pole moves the latch to its holding position and the pole is held in its lowered position by the latch, electrically operated means to lower the pole and means operated by the latch to render inoperative the electrically operated means when the pole is positioned to be held by the latch, means to move the latch to its releasing position to release the pole and the said spring operating to hold the latch in its releasing position after the pole has been released.

6. The combination with a vehicle and a trolley pole of a trolley pole guide and hold-down device comprising means forming a guiding channel to receive and guide the trolley pole when being lowered, a pivotally mounted hook member having two positions, namely, a locking position and a releasing position, the hook member being movable by the pressure thereon of the pole to its locking position to hold the pole in its lowered position, a spring operating to hold the hook member in either its releasing position or its locking position, and electrically operated means to lower the pole and to exert pressure on the hook to move it to its locking position and means to automatically stop the electrically operated means when the hook is in its locking position.

ERNST A. LARSSON.